(12) United States Patent
Dellanno (10) Patent No.: US 10,040,379 B2
(45) Date of Patent: Aug. 7, 2018

(54) SEAT FOR REDUCING THE RISK OF SPINAL INJURIES

(71) Applicant: Ronald P. Dellanno, Bloomfield, NJ (US)

(72) Inventor: Ronald P. Dellanno, Bloomfield, NJ (US)

( * ) Notice: Subject to any disclaimer, the term of this patent is extended or adjusted under 35 U.S.C. 154(b) by 0 days.

(21) Appl. No.: 14/987,952

(22) Filed: Jan. 5, 2016

(65) Prior Publication Data

US 2016/0200226 A1 Jul. 14, 2016

Related U.S. Application Data

(60) Provisional application No. 62/100,116, filed on Jan. 6, 2015.

(51) Int. Cl.
*B60N 2/427* (2006.01)
*B60N 2/888* (2018.01)
*B60N 2/42* (2006.01)

(52) U.S. Cl.
CPC ....... *B60N 2/42718* (2013.01); *B60N 2/4207* (2013.01); *B60N 2/42709* (2013.01); *B60N 2/888* (2018.02)

(58) Field of Classification Search
CPC ............ B60N 2/42718; B60N 2/42709; B60N 2/888; B60N 2/4207
USPC ... 297/216.1, 452.22, DIG. 1, 284.9, 452.24, 297/452.26; 5/653
See application file for complete search history.

(56) References Cited

U.S. PATENT DOCUMENTS

| | | | | |
|---|---|---|---|---|
| 2,855,986 A | * | 10/1958 | Engelen, Sr. | B60N 2/70 297/230.1 |
| 3,222,694 A | * | 12/1965 | Schick | A47C 7/021 297/219.1 |
| 4,132,228 A | * | 1/1979 | Green | A47C 7/022 297/284.3 |
| 4,951,334 A | * | 8/1990 | Maier | A61G 5/1043 297/452.21 |
| 5,144,705 A | * | 9/1992 | Rogers | A61B 5/1036 5/654 |
| 5,165,752 A | * | 11/1992 | Terry | B62J 1/18 297/202 |
| 5,269,590 A | * | 12/1993 | Carilli | A47C 7/021 297/216.1 |
| 5,273,510 A | * | 12/1993 | Puckett | A63B 21/00047 482/142 |
| 6,070,271 A | * | 6/2000 | Williams | A42B 3/128 2/412 |
| 8,016,350 B2 | * | 9/2011 | Dellanno | B60N 2/4885 297/216.12 |
| 9,789,018 B2 | * | 10/2017 | Anderson | A61G 5/1043 |

(Continued)

*Primary Examiner* — Milton Nelson, Jr.
(74) *Attorney, Agent, or Firm* — G. Giennon Troublefield, Esq.

(57) ABSTRACT

A seat is provided having a layer of high impact energy absorbing material and a sacral well provided therethrough. The seat may form a bottom portion of a vehicle seat that may further include a back support portion extending upwardly for supporting the rearward side of a seated individual. The back support may include a lower section for supporting the thorax and lower back, and an upper section. There may be one or more overlying sections positionable for supporting and restraining rearward movement of an individual.

22 Claims, 6 Drawing Sheets

(56) References Cited

U.S. PATENT DOCUMENTS

| | | | | |
|---|---|---|---|---|
| 2005/0022305 A1* | 2/2005 | Bieganek | ............... | A47C 7/022 |
| | | | | 5/630 |
| 2007/0096523 A1* | 5/2007 | Greene, Jr. | ............ | A47C 7/024 |
| | | | | 297/284.7 |
| 2014/0173812 A1* | 6/2014 | Krueger | ................. | A42B 3/122 |
| | | | | 2/455 |

* cited by examiner

SEAT FOR REDUCING THE RISK OF SPINAL INJURIES

FIELD OF INVENTION

This invention provides a seat useful in, vehicular passenger seats incorporating features for reducing the severity of spinal cord injuries such as those resulting from collisions and accidental impacts.

BACKGROUND OF INVENTION

Increasing efforts have in recent years been made by manufacturers and governmental regulation to prevent or minimize injuries sustained by automobile passengers during accidental collisions. For instance, a series of inventions provides seat constructions that serve to minimize or prevent whiplash and similar injuries that occur upon rear end impact at a vehicle in which the passenger is riding such as those inventions provided in U.S. Pat. Nos. 5,181,763, 5,290,091, and 5,580,524, the disclosures of which are incorporated herein by reference.

Many variables can influence the forces to the spine that can cause injury, for instance, the size of the vehicles, the size of the occupants, and the speeds of the vehicles. Attempting to prevent whiplash injury thus can be a daunting task. However, reducing the global movement of the entire spine and the relative movement of each vertebra appear to be the most practical approach in the prevention of injury to the spine. To accomplish this, all spinal curves should be supported and decelerated at as close to a zero delta velocity as possible. This requires support systems within head-neck restraints and seats that are contoured to the spine to reduce the spinal straightening observed during rear end impact. Additionally, the head-neck restraint and seat back should have complementary dampening characteristics so that simultaneous deceleration of the head, neck, thoracic, and lumbopelvic areas can be achieved.

Dellanno, U.S. Pat. Nos. 5,181,763 and 5,290,091 provide an apparatus for preventing whiplash-related injuries to a passenger in a vehicle. The characteristic shapes of the devices shown therein define a supporting means and contour located behind the cranium and cervical spine of the passenger that interfit with the posterior contour of the passenger's cranium and cervical spine. The supporting means interacts with the passenger during rear end impact to maintain the pre-collision shape of the supported spinal curves, to thereby aid in the avoidance of whiplash and similar injuries. The support contour basically presents a first surface located behind the seated passenger's cranium for contacting the approximate center of mass of the cranium and supporting the approximate central posterior area of the seated passenger's cranium, and a second surface located below the first surface and defining a substantially convex smooth curve, a maximum protrusion point of which in the direction of passenger support projects anteriorly relative to where the first surface contacts the center of mass of the related passenger's cranium, said second surface thereby contacting and supporting the posterior portion of the seated passenger's cervical spine substantially simultaneously with the contact of the seated passenger's cranium with said first surface.

Dellanno, U.S. Pat. No. 5,580,124 provides a vehicle-installed supporting seat for a passenger, which includes a seat back provided with an integral head-neck restraint comprising a cranium support portion and a cervical spine support portion. Each said portion includes a layer of resilient material supported on an underlying inflexible support shell, which together act to effectively define a contour that interfits with the posterior contour of the passenger's cranium and cervical spine. The support shell is rearwardly displaceable upon being subjected to impressed forces generated from the passenger pressing against the restraint as a result of a rear end impact at said vehicle. A controllably deformable energy absorbing crush zone is disposed to the rear of the shell as to be compressed by the rearward displacement of the shell. The interfitting contour and thereby the inflexible shell, upon being displaced by said forces toward the underlying crush zone, retain the shape of the contour, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The apparatus of Dellanno, U.S. Pat. No. 5,580,124 preferably further includes a thoracic and lumbar spine support portion which are defined by downward extension of the support shell, resilient material and contour; whereby the thoracic and lumbar spine portion of the passenger are decelerated with the cranium and cervical spine during a rear end impact.

The thoracic section of the human spine is believed to be compressed and flattened during a rear end impact. In addition to being injured, this flattening of the thoracic spine causes axial loading into the cervical spine as the weight of the head and upward pressure of the flattening thoracic spine serve as end point forces to damage the cervical spine. Where present, the thoracic portion of the above seat serves to prevent the flattening of the thoracic spine by having a kyphotic or concave firm contoured shell that takes the shape of the human thoracic spine and maintains this shape during rear end impact. This firm contoured shell precedes the crush zone material which plastically deforms and produces a controlled damping of the forces incurred during a rear end collision.

The lumbar section of the seat will conform to the lumbar spinal curves of the human anatomy. The initial foam that contacts the occupants is combined with the crush zone feature to maximize the energy-absorbing feature of this technology.

It is essential that upon a rear impact at the vehicle, a relatively inflexible surface which approximately conforms to the spine of the seated passenger (herein referred to as the "shaped surface") provides a restraining boundary which maintains the normal curvature of the spine; this despite the fact that the passenger will be subjected to large forces generated by the impact which would otherwise rearwardly accelerate the passenger with respect to the vehicle as a frame of reference.

Dellanno, U.S. Pat. No. 7,090,292 provides an apparatus for preventing or limiting spinal injuries to a passenger seated in a forward facing position in a moving vehicle during vehicular impact or sudden deceleration. The apparatus includes a vehicle-installed supporting seat for the passenger, the seat having a support portion behind the seated passenger which includes a resilient surface in contact with the supported passenger. The resilient portion is supported on an underlying stiff support shell. A controllably deformable energy absorbing crush zone is disposed to the rear of the shell as to be compressed by rearward displacement of the passenger, whereby the support portion acts to decelerate the supported spine of the passenger during a vehicle rear end impact, while the controlled deformation of the crush zone absorbs energy, to prevent or limit spinal injuries to the passenger. The crush zone material is characterized in a rear end collision by exhibiting a total energy absorption of the kinetic energy gained by the impact accelerated passenger of at least 80%; and the coefficient of restitution for the crush zone material being in the range of 0.05 to 0.4.

Dellanno, U.S. Pat. No. 8,016,350 provides a vehicle seat for use in military vehicles that provides increased protection for a combatant soldier. The seat includes a seat portion having a layer of high impact energy absorbing material. A back support portion adjoined to the rear of the seat portion extends upwardly for supporting the rearward side of the seated soldier. The back portion has a lower section for supporting the thorax and lower back, and two overlying sections which are positionable for supporting and restraining rearward movement of the helmeted or unhelmeted head and the neck. The overlying sections are moveable toward and away from the soldier and together define a surface and contour which interacts with the seated soldier during rear end impact to maintain the pre-collision shape of the soldier's supported spinal curves, to aid in avoidance of whiplash and similar injuries. Swivelable side portions actuated by sensors flank the sides of the soldier for further protection.

It is necessary for some seats to protect occupants from impact. In the airline industry, for example, regulations call for a seat that can protect a passenger from a specified shock input. Traditionally, a thick foam cushion on the seat pan would be used to absorb the shock. Theoretically, the additional sway space would be enough to absorb the shock. Testing has proved this to be inadequate, however. In fact, the cushion can actually cause amplification of the shock input. Bottoming out or compression of the foam to a maximum may result in rebound of the foam, which can amplify a shock. Other problems facing seating designers include designing a seat for a wide range of occupant sizes and shapes. These all must be achieved while meeting the economic criteria of cost and weight.

It is desirable to transfer vertical underbody blast loading from underneath a vehicle through the seat and into the sacral region of the spine and divert most of the loading to the sacral-iliac joint. This results in spreading the force over a greater surface area and diverting more energy to the iliac bones, which is a much easier injury to correct than a spinal fracture which can result in paralysis.

SUMMARY OF INVENTION

In a first aspect, the invention provides a seat for supporting an individual when seated thereupon, the seat being formed of a high impact energy absorbing material. The seat provides a sacral well formed or positioned therethrough. The sacral well is defined by a void, hole or aperture of a suitable size and shape to accommodate the coccyx or anus of the individual when seated upon the seat. The sacral well may be of any suitable shape, for instance, round, oval, rectangular or elliptical, and the sacral well may be of any suitable size, for instance 1.0, 2.0, 2.5, 2.75, 3.0, 3.25, 3.50, 3.75, 4.0 or 4.25 or so inches by 3.0, 3.25, 3.50, 3.75, 4.0, 4.25, 4.50, 4.75, 5.00, 5.25, 5.50, 5.75, 6.00, 6.25, 6.50, 6.75, or 7.00 or so inches. The sacral well is defined by a wall, and the wall may be provided at differing angles of from 1 degree to 45 degrees relative to vertical, for instance, 1, 2, 3, 4, 5, 10, 15, 20, 25, 30, 35, 40 or 45 degrees relative to the vertical axis of the spine.

The seat may be formed of one, two, three, four, five, six, seven, eight or more layers of a suitable high impact energy absorbing material. The seat may be, for instance, 1.0, 2.0, 2.5, 2.75, 3.0, 3.25, 3.50, 3.75, 4.0, 4.25, 4.50, 4.75, 5.00, 5.25, 5.50, 5.75, 6.00, 6.25, 6.50, 6.75, or 7.00 or 8.00 or so inches thick. The sacral well is normally depressed in the seat and is designed for relieving vertical round forces to the coccyx and sacrum of a seated individual. The seat may be suitable for positioning or resting on a seat pan.

The seat may be formed of any suitable high impact energy absorbing material such as, for instance, a semi-solid shear-thickening viscoelastic polymer. Also, the seat may be made of commercially available open cell polyurethane foams such as Confor® Foams, or Zorbium or Skydex. The foams may be designed to provide high energy absorption upon impact. The high impact energy absorbing material may be effective to absorb 200 g of force in 5 msec and prevent the sacrum from touching the surface beneath the seat. The foams may have a density of approximately 5.0, 5.5, 6.0, 6.4, 6.5, 7.0, 7.5, or 8.0 or so lbs/cubic foot.

The seat featuring the sacral well is effective to redirect a vertical load caused by impact away from the sacrum and spine of an individual and into the adjacent illiums or sacro-iliac joint where potential injuries are more easily treated. That is, the seat featuring a sacral well may be effective to reduce blast force from an impact and also to redirect that blast force away from the spine where vertebral fracture might occur thereby reducing the incidence of vertebral fracture.

In a second aspect, the invention provides a vehicle seat featuring a bottom seat portion (essentially the seat of the first aspect described herein) being formed of a high impact energy absorbing material. The bottom seat portion of the seat provides a sacral well formed or positioned therethrough. The sacral well is defined by a void, hole or aperture of a suitable size and shape to accommodate the coccyx or anus of the individual when seated upon the seat. The sacral well may be of any suitable shape, for instance, round, oval, rectangular or elliptical, and the sacral well may be of any suitable size, for instance 1.0, 2.0, 2.5, 2.75, 3.0, 3.25, 3.50, 3.75, 4.0 or 4.25 or so inches by 3.0, 3.25, 3.50, 3.75, 4.0, 4.25, 4.50, 4.75, 5.00, 5.25, 5.50, 5.75, 6.00, 6.25, 6.50, 6.75, or 7.00 or so inches. The sacral well is defined by a wall, and the wall may be provided at differing angles of from 1 degree to 45 degrees relative to vertical, for instance, 1, 2, 3, 4, 5, 10, 15, 20, 25, 30, 35, 40 or 45 degrees relative to the vertical axis of the spine. The bottom portion of the seat may be suitable for positioning or resting on a seat pan.

The bottom seat portion may be formed of one, two, three, four, five, six, seven, eight or more layers of a suitable high impact energy absorbing material. The bottom seat portion may be, for instance, 1.0, 2.0, 2.5, 2.75, 3.0, 3.25, 3.50, 3.75, 4.0, 4.25, 4.50, 4.75, 5.00, 5.25, 5.50, 5.75, 6.00, 6.25, 6.50, 6.75, or 7.00 or 8.00 or so inches thick. The sacral well is normally depressed in the seat and is designed for relieving vertical round forces to the coccyx and sacrum of a seated individual.

The bottom seat portion may be formed of any suitable high impact energy absorbing material such as, for instance, a semi-solid shear-thickening viscoelastic polymer. Also, the bottom seat portion may be made of commercially available open cell polyurethane foams such as Confor® Foams, or Zorbium or Skydex. The foams may be designed to provide high energy absorption upon impact. The high impact energy absorbing material may be effective to absorb 200 g of force in 5 msec and prevent the sacrum from touching the surface beneath the seat. The foams may have a density of approximately 5.0, 5.5, 6.0, 6.4, 6.5, 7.0, 7.5, or 8.0 or so lbs/cubic foot.

The bottom seat portion featuring the sacral well is effective to redirect a vertical load caused by impact away from the sacrum and spine of an individual and into the adjacent illiums or sacro-iliac joint where potential injuries are more easily treated. That is, the bottom seat portion featuring a sacral well may be effective to reduce blast force from an impact and also to redirect that blast force away from the spine where vertebral fracture might occur thereby reducing the incidence of vertebral fracture.

The vehicle seat may further feature a back support portion adjoined to the rear of the bottom seat portion of the seat or adjoined to a seat pan that extends upwardly for supporting the rearward side of the seated individual. The back portion may feature a lower section for contacting and supporting the thorax and lower back of the seated individual. The vehicle seat may further feature one or two or more overlying sections which are positionable to effectively restrain rearward acceleration of the head and neck regions of the seated individual caused by an impact. The overlying sections may include surfaces facing the seated individual that are each independently moveable toward and away from the seated individual.

In some embodiments motor means may be provided for moving each of the surfaces of the overlying sections respectively into at least indirect contact with the head and neck regions of the seated individual. The sections per se may also be moved as unit structures in the vertical and horizontal directions to achieve the desired contact.

In some embodiments, a sensor may be provided at each overlying section to sense the proximity of an adjacent head and neck region of the individual, and such sensors may actuate motor means to move the sections or surfaces facing a seated individual into contact with the head and neck region of the individual. In additional embodiments, a pair of upper swivelable side portions may be provided to flanks the sides of the two overlying portions. Similarly, motor means may be provided for swiveling each of these upper side portions into at least indirect contact against the sides of the face and the ears of a seated individual. A sensor at each of the upper side portions may be connected to sense the proximity of the adjacent sides of the face of a seated individual and actuate the motor means to move the portions into such contact with the sides of the face. Each upper side portion may in some embodiments be further provided with a bulletproof transparent section to avoid blocking a seated individual's peripheral vision.

In some embodiments, the parts of the two overlying sections respectively that are proximate to and support the head and neck of a seated individual may define a supporting means and contour that interacts with a seated individual during rear end impact to maintain the pre-collision shape of the supported spinal curves, to aid in the avoidance of whiplash and similar injuries.

In still other embodiments, the vehicle seat further provides one or more lower swivelable protective side portions that may be removable flanking at least portions of the sides of the back support portion. Motor means may be used for swiveling each lower side portion against the sides of a seated individual. Similarly, a sensor may be provided at each lower side portion connected to sense the proximity of the adjacent sides of a seated individual and actuate the motor means to move lower side portions into at least indirect contact with the sides of an individual.

The vehicle seat may in some instances further provide an anti-ballistic shield behind the upper portions. The upper side portions and the lower side portions, as well as the back support portions may inner linings of a high impact energy absorbing material, and outwardly facing coverings of an anti-ballistic material such as Kevlar. The entire vehicle seat may be mounted to the floor of a vehicle by means enabling the seat to rotate about a vertical axis.

BRIEF DESCRIPTION OF THE DRAWINGS

The invention is diagrammatically illustrated, by way of example, in the drawings appended hereto.

FIG. 5 (A, B) represents that the sacrum loading is greatly reduced in a seat containing a sacral well in accordance with the present invention. (A) earlier design and (B) sacral well design as described herein.

DETAILED DESCRIPTION OF THE PREFERRED EMBODIMENTS

The seats and vehicle seats described herein are designed to focused on the interface between the seat and an individual seated therein, and are capable of operating with a variety of different energy absorbing systems. Shock mitigation is managed by a combination of the sacral well design located in the seat pan and energy absorbing foams used in the race car industry. This design feature was tested utilizing the WSU human finite element model in combination with the Cervigard SmartSeat® finite element seat model. The WSU simulations show the intended effect of transferring the vertical underbody blast loading from underneath a vehicle through the seat and into sacral region of the spine and divert most of the loading to the sacral-iliac joint. This results in spreading the force over a greater surface area and diverting more energy to the iliac bones, a much easier injury to correct than a spinal fracture that may even result in paralysis.

A sacral well simulation using the human finite element model was run with an acceleration pulse of 200 g's in 5 msec and resulted in a significant reduction of load to the sacrum to non-injury levels. This injury mitigation is in addition to the protective capabilities of the seat as demonstrated by the Hybrid III simulations run with an acceleration pulse of 350 g in 5 msec. The seat and vehicle seat described herein may provide a total G-force mitigation potential of both systems totaling approximately 500 g in 5 msec, especially when the anatomic benefits are factored into the analysis.

The seats and vehicle seats described herein employ a two tier protection system to reduce the incidence of pelvic fracture resulting from impact. The first tier is the energy absorbing padding on the seat pan to reduce the peak forces and amount of energy transmitted from the seat to the individual occupant. The second tier incorporates a sacral well design that greatly reduces loading to the sacrum and redirects the transmitted load through the ischial tuberosities, a more robust portion of the pelvic anatomy that are capable of carrying a higher level of load without failure. The combination of these protective systems better protects the individual occupant during impact.

The seats and vehicle seats described herein incorporate a system and materials to dissipate energy. Materials including foams useful for forming the seats described herein may achieve this through hysteretic loss, directly converting mechanical energy into low-grade heat. This ability arises from the chemical makeup of the material, a unique polyurethane polymer structure that gives the material its rate responsiveness. Materials having a significant amount of internal hysteretic damping, giving rise to energy absorption and thermal forming properties are desirable. Similarly, materials including foams that respond to temperatures so that when placed against a warm body, the material or foam molds around the body are also desirable. This molding action may contribute to the equal distribution of applied loads to the body. Equal distribution of applied loads eliminates pressure points thereby eliminating vascular restriction and improving comfort, particularly after long-term use. The thermal forming behavior may enhance pressure reduction capabilities.

It is important to consider the weight of individuals seated in the seats described herein. It is possible to incorporate a composite material of multiple stiffnesses. It is desirable to use materials such as foams that are denser and therefore heavier than traditional seating foams. Therefore, common urethanes may be combined with the materials including foams described herein to provide a lighter, more cost-effective seat without accepting a major reduction in ergonomic performance.

Increasing cushion stiffness and thickness helps absorb impact energy through crush (kinetic energy). The resulting rebound and amplification of energy, however, provides new design problems. Providing a material such as a foam having shock absorption behavior and high internal damping properties is very beneficial. A material such as a foam that may convert mechanical energy into heat, allowing absorption of energy by two different mechanisms, i.e. deflection and heat dissipation, is optimal.

The specific materials or foams used in the seats and vehicle seats described herein may offer protection under vertical blast load conditions of 200 g peak acceleration over a 5 msec duration. Specific foams may be selected to reduce peak lumbar spine forces and pelvic accelerations below accepted injury thresholds with a total seat stroke of less than 6 inches. In some embodiments, 3 inches of foam was added to the seat pan including 2 inches of Confor® Foam (CF-42 and CF-45) and 1 inch of Arpro foam. The density of the Confor® foams was approximately 6.4 lbs/cubic foot. This thickness and material selection provided sufficient protection to the pelvis and spine without having the pelvis bottom out the foam under the stated loading conditions.

The size and dimensions of the sacral well may be determined and optimized as desired. For a $50^{th}$ percentile male occupant, dimensions of the sacral well may be selected as 99 mm wide by 132 mm to 182 mm or so deep. The sacral well may be located along the fore-aft centerline of the seat, with the rear most edge of the opening in line with the forward most surface of the lower seat back cushion. The width of the sacral well should be large enough to avoid direct loading on the sacrum but less than the sum distance between the ischial tuberosities. To provide protection across a wider range of anthropometry, e.g. including $5^{th}$ percentile males, the width of the sacral well may be reduced to 85 mm. Females typically have a wider pelvises and a wider distance between the ischial tuberosities and should be protected by dimensions selected for a $50^{th}$ percentile male. The specific depth of the sacral well may not be as critical as the width. The width may be increased to approximately 150 mm to provide protection for a wider range of anthropometry including $95^{th}$ percentile males.

Figure 1:
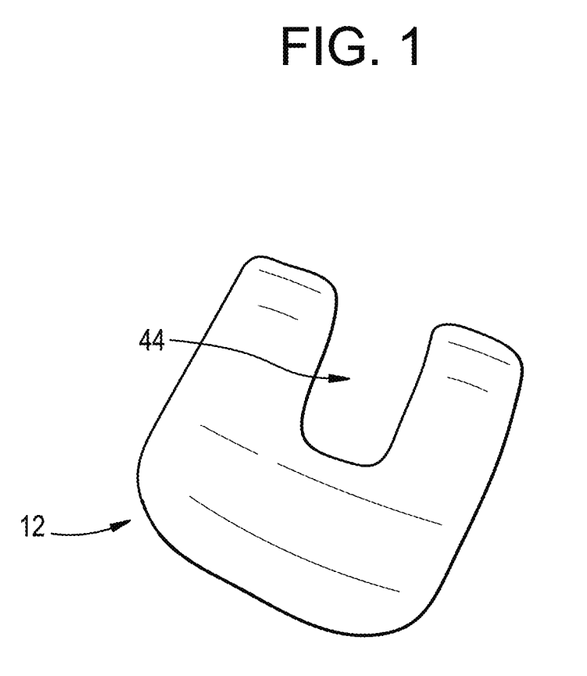
FIG. 1 is a simplified perspective view of a seat or seat bottom that may be incorporated into a vehicle seat in accordance with the present invention.

In FIG. 1 a simplified perspective view is of a seat portion 12 for supporting a person seated thereon featuring a depressed sacral well 44 for relieving vertical round forces to the seated person's coccyx/sacrum.

Figure 2:
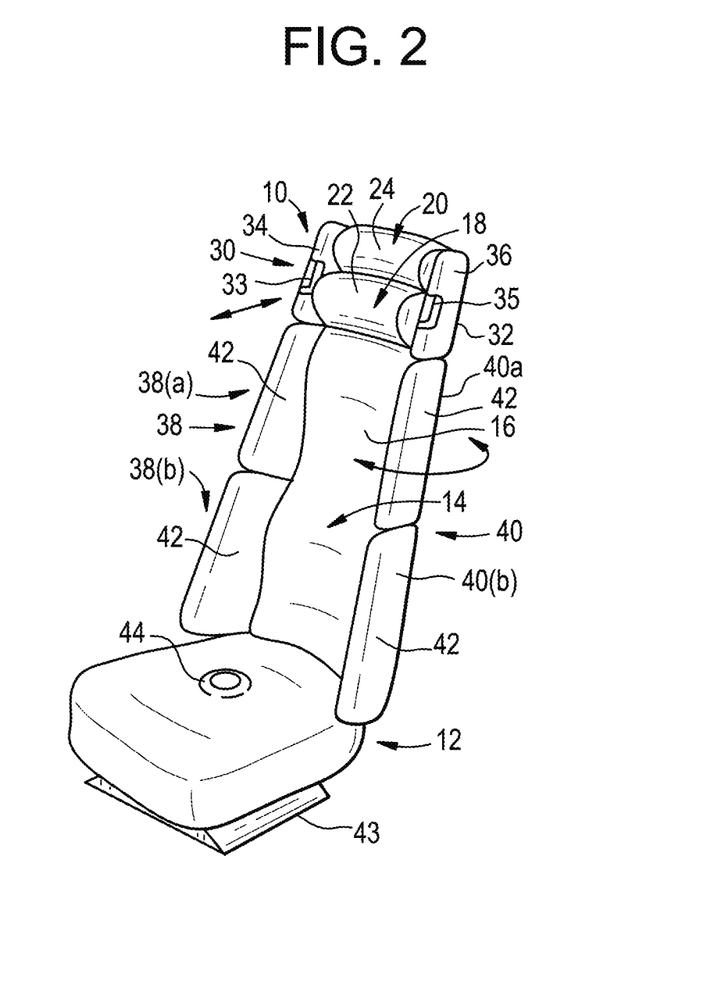
FIG. 2 is a simplified perspective view of a seat in accordance with the present invention.

In FIG. 2 a simplified perspective view is shown of a vehicle seat 10 in accordance with the present invention. Seat 10 includes a seat portion 12 for supporting the person seated thereon, and a back support portion 14 adjoined to the rear of the seat portion and extending upwardly for supporting the rearward side of the seated person. Back portion 14 comprises a lower section 16 for contacting and supporting the thorax and lower back of the seated person, and two overlying sections 18 and 20. The lower of these, section 18, is positionable proximate to and supporting the neck of the seated person, while section 20 is positionable proximate to and supporting the helmeted head of the seated person. The overlying sections 18 and 20 are each independently moveable vertically and horizontally by means of servomotors, toward and away from the parts of the seated person which they are designed to support. More generally, at least the surfaces of sections 18 and 20 which face and will contact the seated person 28 are displaceable in the vertical and horizontal directions. This can be accomplished by independently so displacing the entire sections 18 and 20 as units. However the entire sections need not move as units toward or away from the operator, so long as the surfaces facing the operator can be so displaced, e.g. by being expanded toward or contracted (due to elasticity) away from the desired contact position. More commonly such surface movement without entire section movement will be applicable to the horizontal surface displacement, i.e. the vertical surface displacement will more readily be accomplished by vertically moving the section bearing the surface as a unit. Sensors 22 and 24 are provided at each upper section which sense the proximity of the adjacent helmet 6 and neck region of the seated person and actuate the motors to move said sections into contact with the head and the neck region.

Lower contact section 18 is supported on a helically threaded member 60 which is anchored in back section 16. A motor when actuated rotates an internally threaded ring which is engaged with a member so as to move section 18 upwardly or downwardly. A plunger having a threaded rod is engaged with a second internally threaded rotatable ring which by its rotation acts to advance or retract the core so as to effect contact with the vehicle operator's neck. It will be apparent that the entire section 18 need not move as a unit toward or away from the operator, so long as the surface facing the operator can expand or contract with the horizontal displacement of the core. In direct analogy, upper contact section 20 is supported on a helically threaded member and motor when actuated rotates an internally threaded ring which is engaged with a member so as to move section 20 upwardly or downwardly or move the surface facing the operator toward or away from contact with the operator. A plunger having a threaded rod is engaged with a second internally threaded rotatable ring which acts to advance or retract the core so as to effect contact of section 20 with the vehicle operator's head.

Vehicle seat 10 is further provided with a pair of upper swivelable side portions 30 and 32, which flank the sides of the two overlying portions 18 and 20. Servomotors are disposed for swiveling each side portion into at least indirect contact against the sides of the face and ears of the seated person. A sensor 34, 36 at each said side portion 30, 32 is connected to sense the proximity of the adjacent sides of the face of the seated person and actuate the motors to move the portions 30, 32 into at least indirect contact with the sides of the face. In order to assure that the seated person has fully adequate peripheral vision, transparent shields 33, 35, are inserted at the side portions 30 and 32.

The vehicle seat 10 is further provided with a pair of protective lower swivelable side portions 38 and 40, which flank at least portions of the sides of back support 16. As seen in the Figure these side portions can actually each consist of two sub-portions as at 38(a) and 38(b) and at 40(a) and 40(b). This enables greater flexibility in adjusting the side portions to accommodate differing body types and differing weights etc. Servomotors swivel each lower side portion 39, 40, or 38(a) and 38(b) and 40(a) and 40(b) against the sides of said seated person; and sensors 42 at each lower side portion or sub-portion are connected to sense the proximity of the adjacent sides of the seated person and actuate the motors to move the lower side portions or sub-portions into at least indirect contact with the sides of the person.

The proximity sensors 22 and 24 provide input signals to control logic 72 which provides actuation signals to the motors in accordance with the detected position of the operator 28, to advance the sections vertically and horizontally to effect the desired contacts with the operator or to move the surface facing the operator toward or away from contact with the operator.

Each of the upper and the lower swivelable side portions, as well as the seat portion 12, have inner linings of a high impact energy absorbing material. This material may be a semi-solid plastic-like substance such as the shear-thickening viscoelastic polymer available as the Zoombang products of Impact Innovative Products of Irwin, Pa.

The seat portion 12 also includes a depressed sacral well 44 for relieving vertical round forces to the seated person's coccyx/sacrum. The entire said vehicle seat 10 is mounted to the floor of the vehicle by a base 43 upon which it is swivelable, enabling the seat to rotate about a vertical axis. This enables the seated person to directly address an attack on the vehicle from the sides or from other directions from the vehicle.

Figure 3:
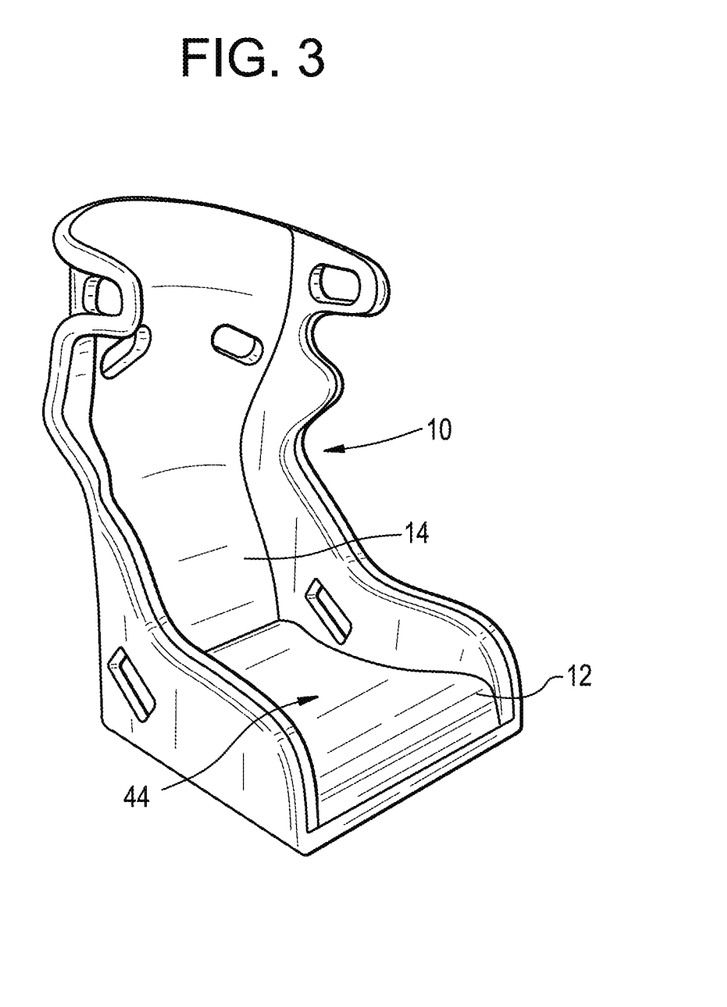
FIG. 3 represents a vehicle seat containing a seat bottom in accordance with the present invention.

FIG. 3 is a representation of a vehicle seat 10 in accordance with the present invention. Seat 10 includes a seat portion 12 for supporting the person seated thereon, and a back support portion 14 adjoined to the rear of the seat portion and extending upwardly for supporting the rearward side of the seated person. The seat portion 12 has inner linings of a high impact energy absorbing material. This material is preferably a semi-solid plastic-like substance such as the shear-thickening viscoelastic polymer available as the Zoombang products of Impact Innovative Products of Irwin, Pa. or one or more layers of Confor® foams. The seat portion 12 also includes a depressed sacral well 44 for relieving vertical round forces to the seated person's coccyx/sacrum. The entire said vehicle seat 10 may be mounted to the floor of the vehicle.

Figure 4:
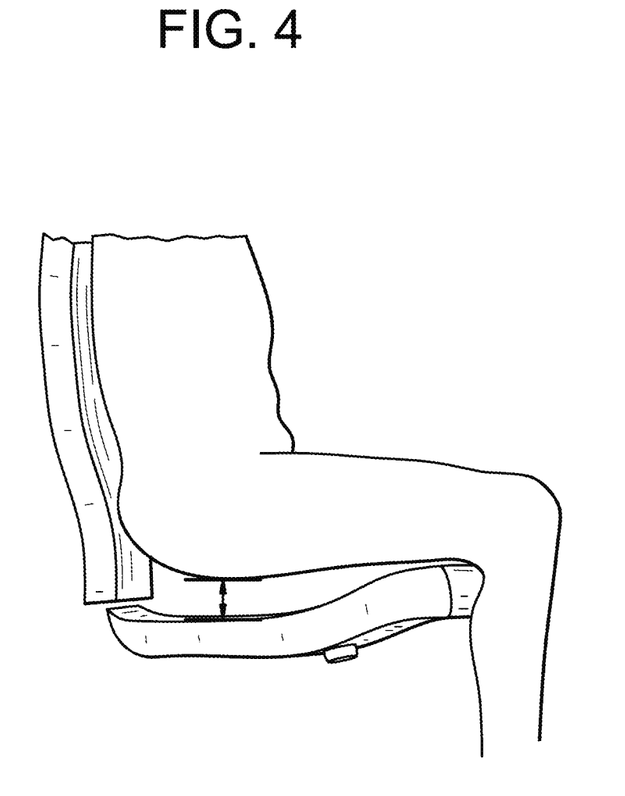
FIG. 4 represents an individual seated upon a seat bottom in a vehicle seat in accordance with the present invention.

FIG. 4 represents an individual seated upon a seat bottom in a vehicle seat in accordance with the present invention. The sacral well is effective at relieving stress on the sacrum and coccyx. Peak stress is transferred to the sacroiliac joint so that energy from an impact is dissipated in the sacroiliac joint rather than being transmitted to the spine.

Figure 5A:
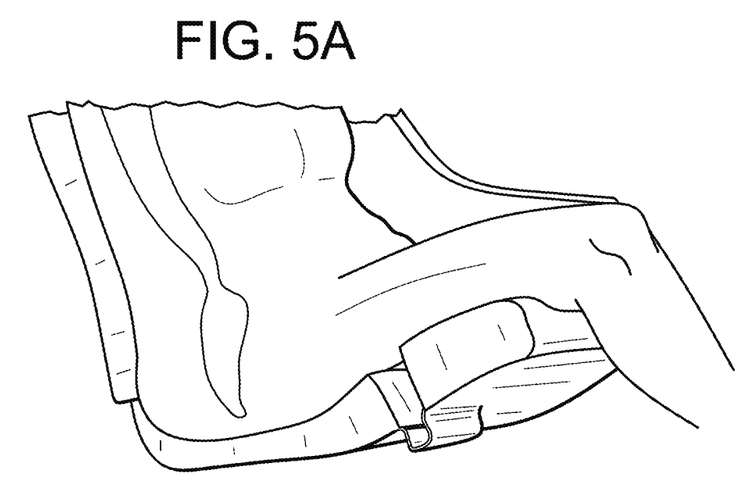
Figure 5B:
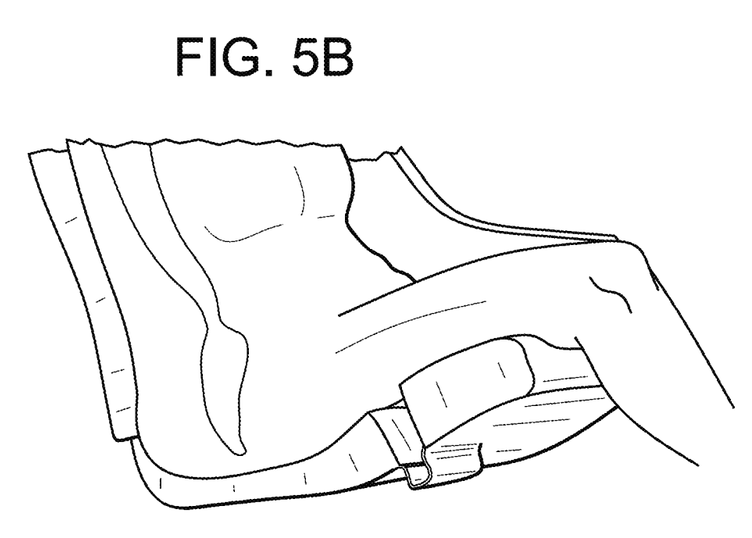

FIG. 5 (A, B) depicts that sacrum loading is greatly reduced in a seat containing a sacral well in accordance with the present invention. Comparing (B) to (A) shows that sacrum loading was greatly reduced using a sacral well as described herein. There was a two thirds reduction in injury based upon stress. Penetration of the sacrum and coccyx does not extend beyond the seat pan upon impact.

Figure 6:
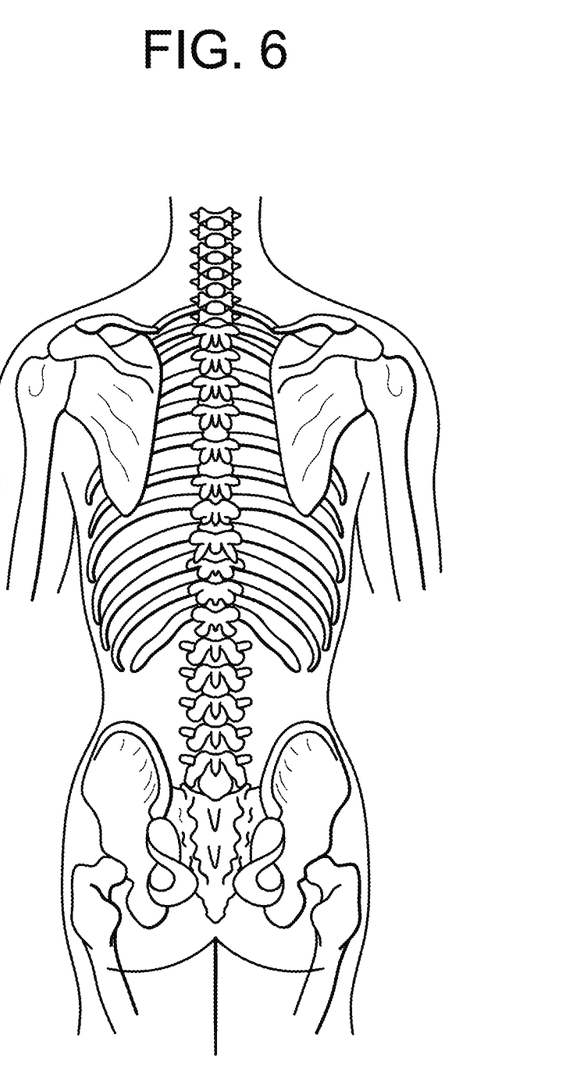
FIG. 6 depicts the human skeletal system and demonstrates how a seat containing a sacral well redirects force from under a seat away from the sacrum and spine and into the ilium (hip) bones where potential bone fracture is a preferred wound.

FIG. 6 depicts the human skeletal system and demonstrates with arrows how a seat containing a sacral well redirects force from under a seat away from the sacrum and spine and into the ilium (hip) bones where potential bone fracture is a preferred wound. Redirecting force to the ilium bones or sacro-iliac joint is more likely to produce an injury that results in a normal recovery compared to an injury to the sacrum and potential spine fracture which has a high incident of permanent disability.

While the present invention has been set forth in terms of specific embodiments thereof, it will be appreciated that in view of the present disclosure, numerous variations upon the invention are now enabled to those skilled in the art, which variations yet reside within the present teachings. Thus while the invention has been particularly described in connection with its use to protect combat and military personnel, it will be evident that the invention has applicability as well to other vehicular operators and passengers, where indeed the reduced forces occurring e.g. in simple collisions are less than in combat situations, so that the likelihood of injuries in these situations is reduced even more than where the invention is employed in combat environments. Accordingly the invention is to be broadly construed, and limited only by the scope and spirit of the disclosure and of the claims now appended hereto.

I claim:

1. A seat for supporting an individual when seated thereupon, formed of one or more layers of a high impact energy absorbing material having a depressed sacral wall at least 3.0 inches wide by at least 4.0 inches long effective for relieving forces to the coccyx or sacrum of the individual and redirecting those forces to the sacro-iliac joint or iliums of the individual upon impact wherein the sacral well is defined by a wall and wherein the wall is provided at an angle of from 1 degree to 45 degrees relative to vertical, and wherein the high impact energy absorbing material is effective to absorb at least 200 g of force in 5 msec and prevent the sacrum from touching a surface beneath the seat and/or prevent the pelvis from bottoming out.

2. The seat according to claim 1 suitable for positioning or resting on a seat pan of a vehicle seat.

3. The seat according to claim 1 wherein the sacral well is defined by a void, hole or aperture of a suitable size and shape to accommodate the coccyx or anus of the individual when seated upon the seat to thereby prevent said sacrum from touching a surface beneath the seat and/or prevent the pelvis from bottoming out.

4. The seat according to claim 1 formed of at least two layers of a high impact energy absorbing material.

5. The seat according to claim 1 effective to reduce blast force from an impact and effective to redirect that blast force away from the spine thereby reducing the incidence of vertebral fracture.

6. The seat according to claim 1 wherein the high impact energy absorbing material comprises a semi-solid shear-thickening viscoelastic polymer or a foam.

7. The seat according to claim 6 wherein the foam has a density of at least about 5.0 lbs/cubic foot.

8. A vehicle seat comprising:
(a) a bottom seat portion for supporting an individual when seated thereupon, the bottom seat portion formed of one or more layers of a high impact energy absorbing material having a depressed sacral well at least 3.0 inches wide by at least 4.0 inches long effective for relieving forces to the coccyx or sacrum of the individual and redirecting those forces to the sacro-iliac joint or iliums of the individual upon impact, wherein the sacral well is defined by a wall and wherein the wall is provided at an angle of from 1 degree to 45 degrees relative to vertical, and wherein the high impact energy absorbing material is effective to absorb at least 200 g of force in 5 msec and prevent the sacrum from touching a surface beneath the seat and/or preventing the pelvis from bottoming out;
(b) a back support portion extending upwardly for supporting the rearward side of the seated individual.

9. The vehicle seat according to claim 8 wherein the sacral well is defined by a void, hole or aperture of a suitable size and shape to accommodate the coccyx or anus of the individual when seated upon the seat.

10. The vehicle seat according to claim 8 wherein the bottom seat portion is formed of at least two layers of a high impact energy absorbing material.

11. The vehicle seat according to claim 8 effective to reduce blast force from an impact and effective to redirect that blast force away from the spine thereby reducing an incidence of vertebral fracture.

12. The vehicle seat according to claim 8 wherein the bottom seat portion is positioned or rests on a seat pan of the vehicle seat.

13. The vehicle seat according to claim 8 wherein the high impact energy absorbing material comprises a semi-solid shear-thickening viscoelastic polymer or a foam.

14. The vehicle seat according to claim 13 wherein the foam has a density of at least about 5.0 lbs/cubic foot.

15. The vehicle seat according to claim 8 wherein the back support portion comprises a lower section for contacting and supporting the thorax and lower back of the individual, and upper and lower overlying sections for being respectively positionable for restraining the head and neck region of the individual from rearward acceleration.

16. The vehicle seat according to claim 15 wherein the overlying sections each have a surface for contacting the individual that is independently moveable toward and away from the individual.

17. The vehicle seat according to claim 15 further comprising a first motor means for moving the upper and the lower of the overlying sections into the positions for respectively restraining rearward acceleration of the head and neck region of the individual.

18. The vehicle seat according to claim 17 further comprising a sensor at each overlying section connected to respectively sense the proximity of an adjacent head and neck region of the individual and actuate the first motor means to move the overlying sections into positions for restraining rearward acceleration of the head and neck region of the individual.

19. The vehicle seat according to claim 15 further comprising a pair of upper swivelable side portions flanking the sides of the upper and lower overlying sections.

20. The vehicle seat according to claim 19 wherein the upper swivelable side portions contain an inner lining of a high impact energy absorbing material.

21. The vehicle seat according to claim 19 further comprising second motor means for swiveling each upper swivelable side portion into at least indirect contact against the sides of the face and the ears of the individual.

22. The vehicle seat according to claim 21 further comprising a sensor at each upper swivelable side portion connected to sense the proximity of the sides of the face of the individual and actuate the second motor means to move the upper swivelable side portions into at least indirect contact with the sides of the face of the individual.

* * * * *